(12) United States Patent
Jespersen et al.

(10) Patent No.: US 12,441,363 B2
(45) Date of Patent: Oct. 14, 2025

(54) ENCODING HOMOTOPY CONSTRAINTS IN SPATIO-TEMPORAL GRIDS

(71) Applicant: Motional AD LLC, Boston, MA (US)

(72) Inventors: Thomas Koelbaek Jespersen, Singapore (SG); Juraj Kabzan, Singapore (SG); Marc Dominik Heim, Singapore (SG); Boaz Cornelis Floor, Singapore (SG)

(73) Assignee: Motional AD LLC, Boston, MA (US)

( * ) Notice: Subject to any disclaimer, the term of this patent is extended or adjusted under 35 U.S.C. 154(b) by 708 days.

(21) Appl. No.: 17/535,542

(22) Filed: Nov. 24, 2021

(65) Prior Publication Data

US 2023/0159054 A1 May 25, 2023

(51) Int. Cl.
*B60W 60/00* (2020.01)
*B60W 40/10* (2012.01)

(52) U.S. Cl.
CPC ........ *B60W 60/0011* (2020.02); *B60W 40/10* (2013.01); *B60W 60/0013* (2020.02); *B60W 60/0015* (2020.02); *B60W 60/0027* (2020.02)

(58) Field of Classification Search
CPC ......... B60W 60/0011; B60W 60/0013; B60W 60/0015; B60W 60/0027; B60W 60/10; B60W 40/10
See application file for complete search history.

(56) References Cited

U.S. PATENT DOCUMENTS

| 11,079,764 B2* | 8/2021 | Nister .................. G05D 1/0242 |
| 2012/0323367 A1 | 12/2012 | MacArthur et al. |
| 2015/0345966 A1* | 12/2015 | Meuleau ............ G01C 21/3469 701/23 |

(Continued)

FOREIGN PATENT DOCUMENTS

DE 102018008624 4/2020

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

(Continued)

*Primary Examiner* — Luke Huynh
(74) *Attorney, Agent, or Firm* — Fish & Richardson P.C.

(57) ABSTRACT

In some aspects and/or embodiments, systems, methods, and computer program products described herein include and/or implement technology for encoding dynamic homotopy constraints in spatio-temporal grids, including a method comprising: determining a plurality of dynamic homotopy constraints associated with a scenario involving a vehicle in an environment; embedding the plurality of dynamic homotopy constraints in a plurality of spatio-temporal grids, where each spatio-temporal grid includes individual grids for each timestep of a prediction horizon, generating a plurality of trajectories based on the plurality of dynamic homotopy constraints embedded in the plurality of spatio-temporal grids; selecting a particular trajectory from among the plurality of trajectories generated; and controlling the vehicle in the environment based on the particular trajectory selected from among the plurality of trajectories.

29 Claims, 10 Drawing Sheets

(56) References Cited

U.S. PATENT DOCUMENTS

| | | |
|---|---|---|
| 2019/0286153 A1 | 9/2019 | Rankawat et al. |
| 2020/0097003 A1 | 3/2020 | Wray et al. |
| 2021/0020045 A1* | 1/2021 | Huang .................. G05D 1/692 |
| 2022/0176995 A1* | 6/2022 | Subramanian ........ B60W 30/08 |
| 2022/0234618 A1* | 7/2022 | Kabzan ............. B60W 60/0013 |

OTHER PUBLICATIONS

International Search Report and Written Opinion in International Appln. No. PCT/US2022/050798, dated Mar. 14, 2023, 11 pages.

* cited by examiner

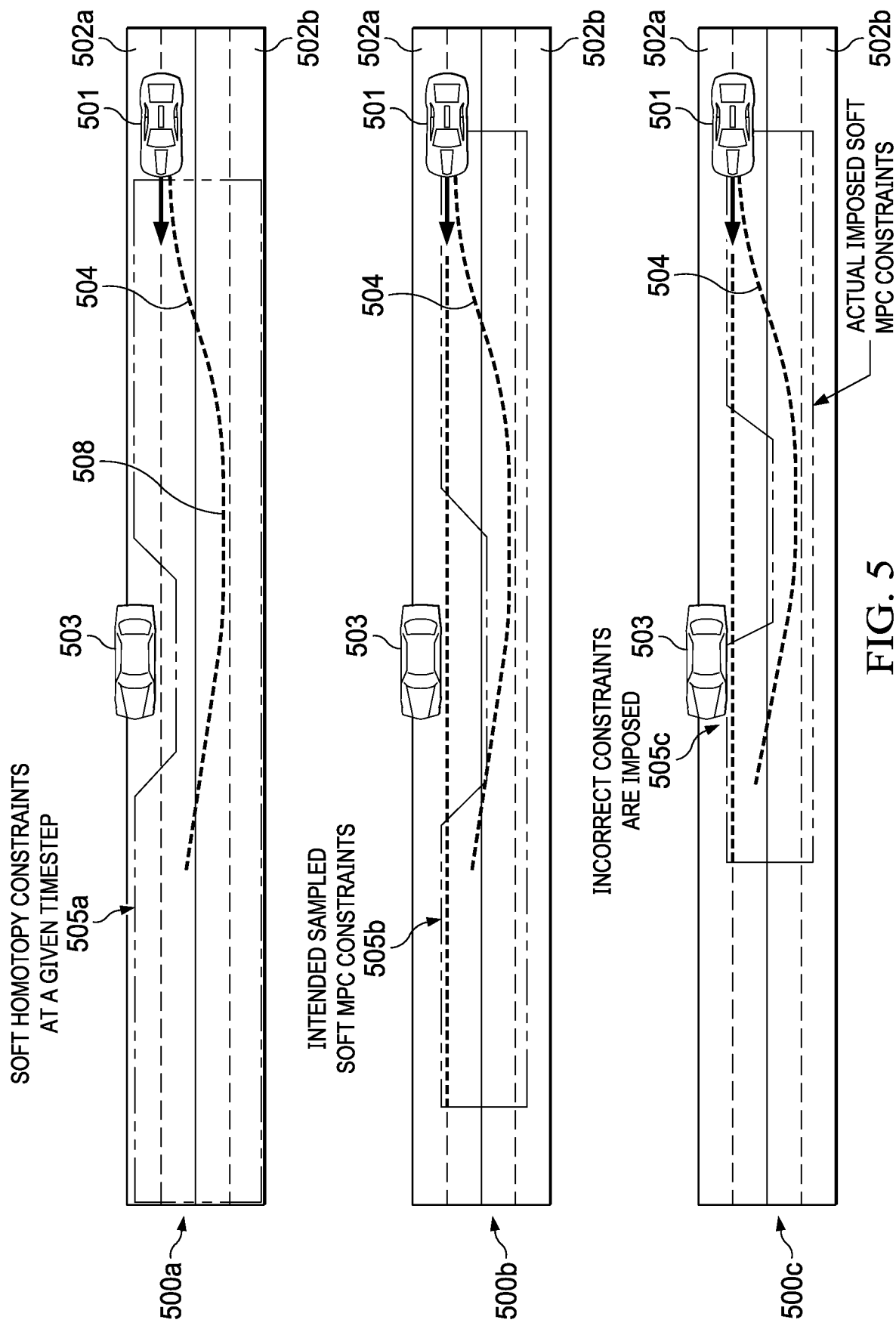

ENCODING HOMOTOPY CONSTRAINTS IN SPATIO-TEMPORAL GRIDS

BACKGROUND

A state of the art planning architecture for autonomous vehicles extracts multiple homotopies, computes candidate trajectories within the homotopies (hereinafter, also referred to as a "trajectory realization"), and selects the best candidate trajectory by cost scoring. A model-predictive control (MPC) trajectory realizer can be used to generate a sample-based trajectory realization by sampling the input homotopy constraints. Because the homotopy constraints are represented by a lane-centric, spatio-temporal tube with left and right bounds, multiple types of maneuvers may be disabled. For example, a vehicle traveling behind another vehicle in an adjacent lane which is initially behind the ego vehicle may not be expressed by a sample-based MPC trajectory realizer in part because decisions are defined across all lanes and the ego vehicle would thus always start outside of a valid homotopy. Also, assumptions are made on the vehicle state propagation through spatial sampling. This leads to a discrepancy between the actual homotopy constraints, representing the physical world and obstacles, and the constraints which the optimal control problem is solved for by the MPC. Large discrepancies especially occur in dynamic environments with fast moving traffic.

BRIEF DESCRIPTION OF THE FIGURES

FIG. 5 illustrates a sampling issue during biasing using a sample-based MPC trajectory realizer;

DETAILED DESCRIPTION

Figure 1:
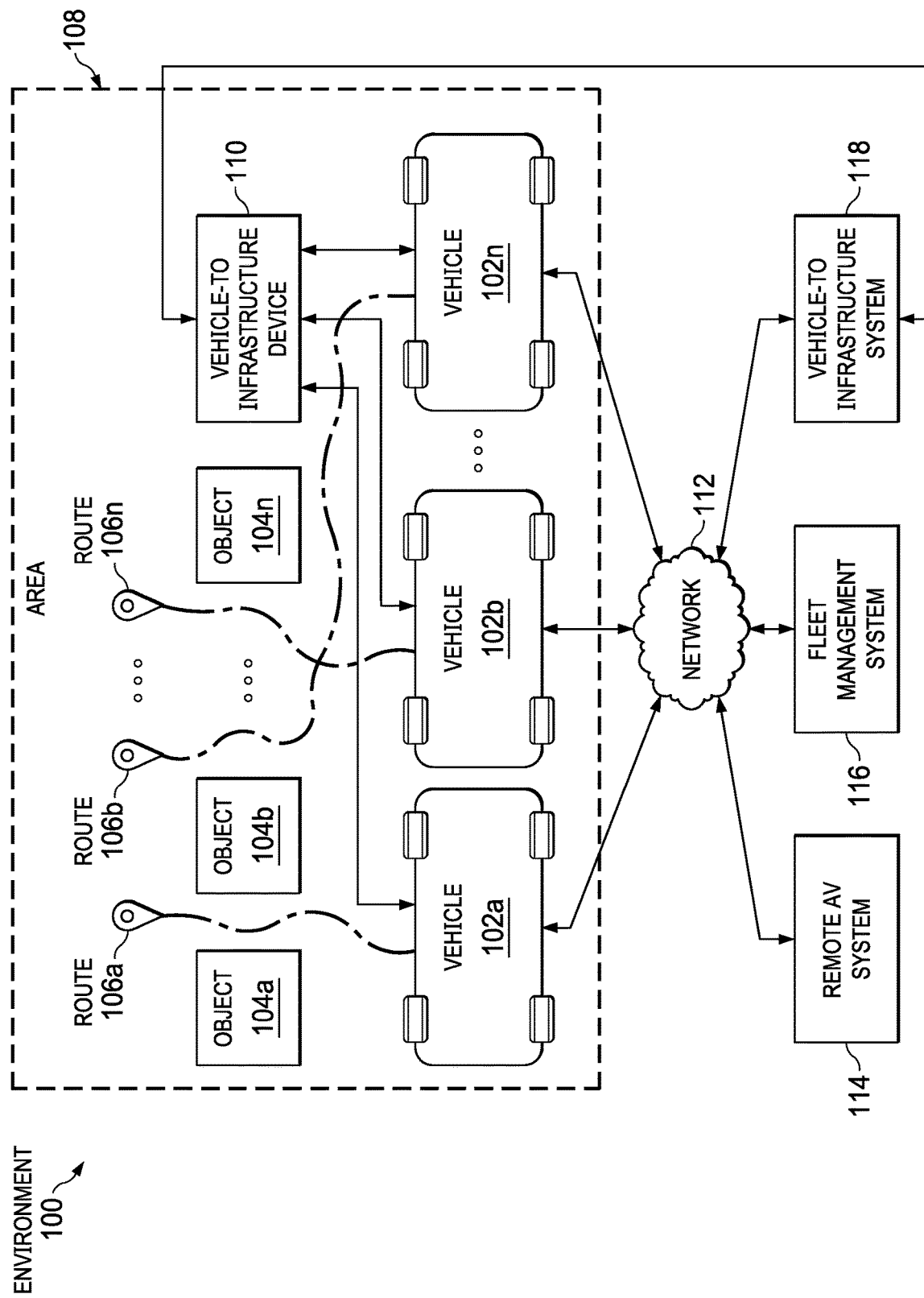
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details.

In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement technology for encoding dynamic homotopy constraints in spatio-temporal grids. A "homotopy" is a unique space wherein any path starting with an initial AV state and ending at a terminal AV state can be continuously deformed The homotopy is encoded (e.g., rasterized) in spatio-temporal grids.

The dynamic homotopy constraints are input into a grid-based trajectory realizer, which generates one grid for each discrete timestep in the MPC prediction horizon to capture the exact geometries of the homotopy constraints originating from both lane geometry and other agents and obstacles, collectively defined as the grid-based dynamic homotopy constraints. Because the grid-based trajectory realizer is formulated as an optimization problem in Cartesian coordinates rather than curvilinear coordinates, and in conjunction with the grid-based dynamic homotopy constraints, the MPC can query the dynamic homotopy constraints more accurately.

In an embodiment, spline functions (e.g., B-splines) are used to make the discrete spatio-temporal grids continuously differentiable, where basis functions (e.g., cubic functions) are used to combine neighboring cell values (e.g., grid occupancy probabilities) in the spatio-temporal grids continuously, while providing the corresponding gradients necessary for MPC. Using splines, unimodal corridor constraints representing the homotopy are encoded in the spatio-temporal grids as convex shapes with smooth edges.

An MPC collision cost is introduced in the total MPC cost equation that includes a static term and a kinetic collision energy term based on a grid cell occupancy probability of a particular location. Probing points on the vehicle perimeter contribute to the MPC collision cost at each MPC prediction stage. The total MPC collision cost is part of the total MPC cost function in a trade-off with other objective functions, such as comfort and tracking cost functions.

In an embodiment, a method comprises: determining, with at least one processor, a plurality of dynamic homotopy constraints associated with a scenario based on one or more agents in an environment; embedding, with the at least one processor, dynamic homotopy constraints in a plurality of spatio-temporal grids a plurality of times for each timestep of a prediction horizon, wherein the embedding comprises: encoding, with the at least one processor, the plurality of dynamic homotopy constraints in the plurality of spatio-temporal grids that represent the environment; and generating, with the at least one processor, a plurality of trajectories based on the plurality of homotopy constraints embedded in the plurality of spatio-temporal grids; selecting, with the at least one processor, a particular trajectory from among the plurality of trajectories generated while updating the plurality of spatio-temporal grids; and controlling, with a control circuit of the vehicle, the vehicle based on the particular trajectory selected from among the plurality of trajectories.

In an embodiment, the plurality of trajectories are generated by a grid-based model-predictive control (MPC) trajectory realizer.

In an embodiment, the grid-based MPC trajectory realizer is formulated as an optimization problem in Cartesian coordinates.

In an embodiment, the optimization problem comprises: computing an MPC collision cost with static and kinetic collision energy terms based on the one or more agents in the environment encoded within a spatio-temporal grid; and contributing to the MPC collision cost probing points on a perimeter of the vehicle when generating the grid-based trajectory realization.

In an embodiment, the method further comprises: determining a total collision cost for a plurality of MPC prediction stages; evaluating an MPC cost function that includes the total collision cost and at least one other cost.

In an embodiment, the at least one other cost is associated with vehicle passenger comfort.

In an embodiment, the at least one other cost is associated with tracking error.

In an embodiment, at least one homotopy constraint is embedded in the spatio-temporal grid as a convex shape with smooth edges.

In an embodiment, the spatio-temporal grid includes a velocity and direction of travel of at least one agent.

In an embodiment, a prediction uncertainty for the at least one agent is encoded within the spatio-temporal grid and included in the optimization problem.

In an embodiment, the spatio-temporal grid is discretized and a spline function is applied to rows and columns of the spatio-temporal grid to make the spatio-temporal grid map continuously-differentiable.

In an embodiment, the spline function is a B-spline.

In an embodiment, cubic basis functions are used to combine neighboring cell values in the spatio-temporal grid continuously, while providing a corresponding gradient for the MPC and are twice differentiable.

In an embodiment, prediction uncertainty is included in the spatio-temporal grid by convolving the spatio-temporal grid with a Gaussian kernel.

By virtue of the implementation of systems, methods, and computer program products described herein, techniques for finding and accessing a vehicle provide at least the following advantages.

The issues discovered in sample-based MPC trajectory realizers are resolved using spatio-temporal grids, such that the enforced constraints within the MPC align with the actual homotopy constraints. With grid-based trajectory realizers, more driving behaviors can be supported than with sample-based trajectory realizers, including but not limited to: multiple lane changes, merging in tight traffic, accelerating to merge in front of vehicles coming from behind, and slowing down to merge behind vehicles coming from behind. The online generation of spatio-temporal grids makes it easy for designers to explore new cost structures leveraging the spatial continuity provided by the spatio-temporal grids without having to reformulate the optimization problem.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote AV system 114, fleet management system 116, and V2I system 118. Vehicles 102a-102n, vehicle-to-infrastructure (V2I) device 110, network 112, AV system 114, fleet management system 116, and V2I system 118 interconnects (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, AV system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202). Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2).

In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202). 6 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)).

In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections.

Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited look ahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
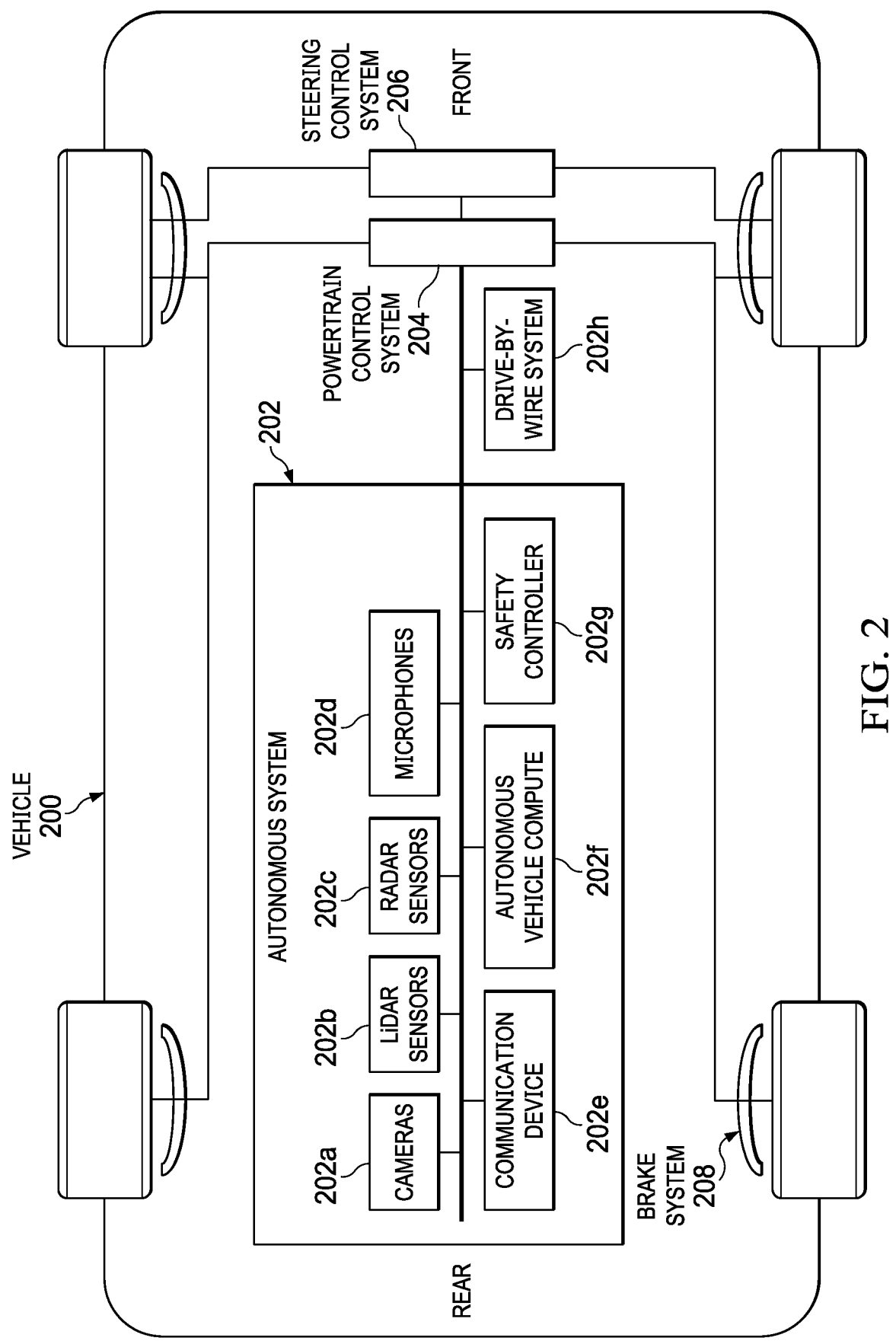
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like).

For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
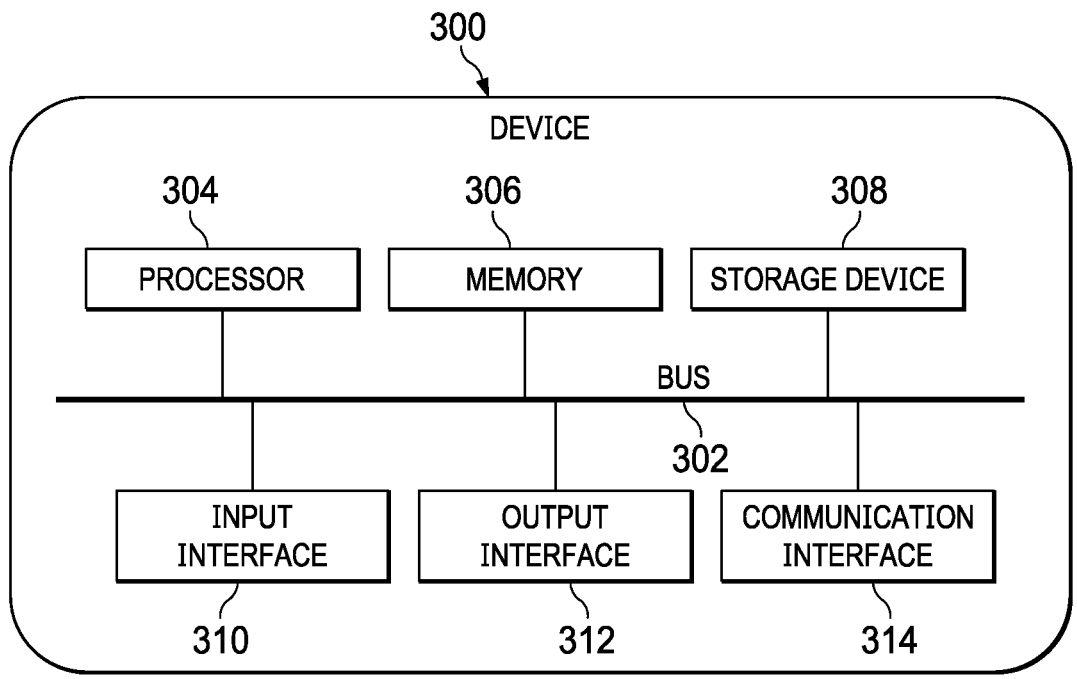
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like).

In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, camera 202a is configured to capture images of objects within a distance from camera 202a (e.g., up to 100 meters, up to a kilometer, and/or the like). Accordingly, camera 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes computer processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of, and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, computer processor 304, memory 306, storage component 308, input interface 310, output interface 312, and communication interface 314.

Bus 302 includes a component that permits communication among the components of device 300. In some embodiments, computer processor 304 is implemented in hardware, software, or a combination of hardware and software. In some examples, computer processor 304 includes a computer processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by computer processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on computer processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause computer processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by computer processor 304 and/or by a computer processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Figure 4:
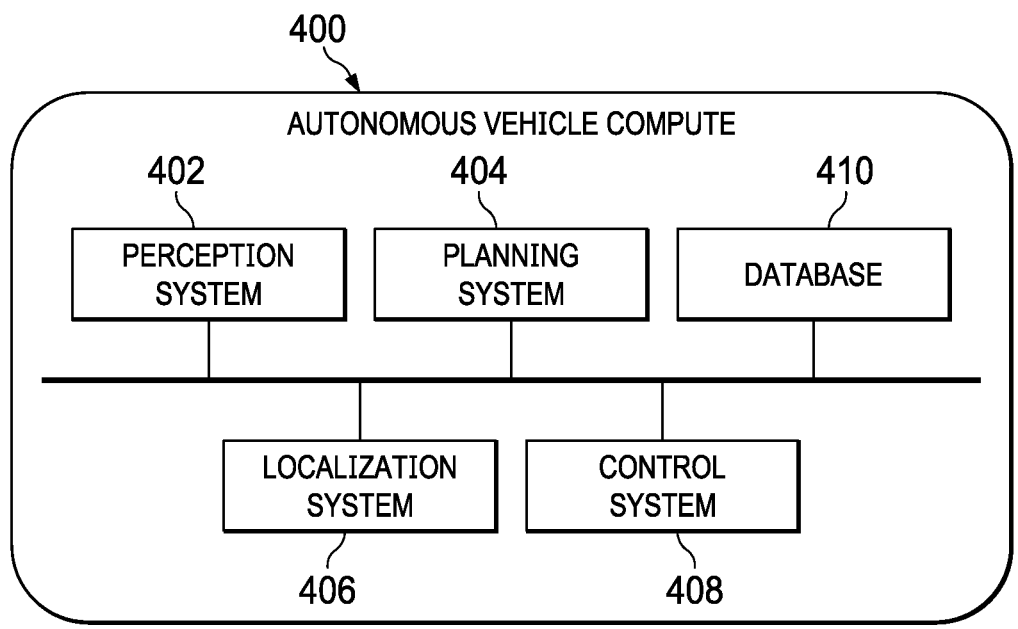
FIG. 4 is a diagram of certain components of an autonomous system.

Referring now to FIG. 4, illustrates is an example block diagram of an AV compute 400 (sometimes referred to as an "AV stack"). As illustrated, AV compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware.

It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of AV compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LIDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Spatio-Temporal Grids

FIG. 5 illustrates issues during biasing using a sample-based MPC trajectory realizer, according to an embodiment. Three sets of lanes 500a, 500b and 500c are shown, where a first set of lanes 500a shows soft dynamic homotopy constraints 505a at a given MPC time step, a second set of lanes 500b shows the intended sampled soft MPC constraints 505b at the given time step and a third set of lanes 500c shows the incorrect actual imposed soft MPC constraints 505c at the given time step.

In an embodiment, each dynamic homotopy constraint is defined by station-time and station-spatial-time constraints. Soft constraints are constraints that should be followed by the AV but can be violated to, for example, complete a trip to a destination or to avoid a collision. Some examples of "soft" constraints include but are not limited to: passenger comfort constraints and a minimum threshold of lateral clearance from a pedestrian who is crossing the street ("jaywalking") to ensure that the pedestrian and the AV passenger are comfortable with the AV's maneuvering. In an embodiment, soft constraints can be embodied in one or more hierarchical or non-hierarchical rulebooks. Soft constraints can include spatial constraints that change over time (e.g., lanes that open up as traffic proceeds) or station constraints that change over time (e.g., a traffic light turning from red to green). A spatial constraint can be, for example, a drivable area.

By contrast, hard constraints are logical constraints that must not be violated because, if violated, the AV would collide with another object, such as a pedestrian who may be "jaywalking" across the road. Note that hard constraints do not imply "do not collide" since they also capture intended maneuver decisions such as: "keep ego vehicle in current lane", in which case the hard constraint would limit the vehicle to the current lane.

For example, a hard constraint can defined by time instances, such that an example wording could be: "at t+1 seconds the vehicle has to be within these bounds, defined around the centerline of the lane, both laterally and longitudinally (i.e., station constraints)."

A sample-based trajectory realization 504 is generated by a sample-based MPC trajectory realizer. Trajectory realization 504 allows vehicle 501 to change from first lane 502a to second lane 502b to travel around agent 503 (e.g., a parked vehicle) which is in front of vehicle 501 in first lane 502a. As shown in set of lanes 500a, biasing 508 of trajectory realization 504 occurs too early due to sampling issues related to the sample-based trajectory realizer, resulting in incorrect constraints being imposed on sample-based trajectory realization 504. To avoid incorrect constraints being imposed on a trajectory realization, the homotopy constraints are encoded into continuously-differentiable, spatio-temporal grids that are incorporated into an MPC, as described in reference to FIGS. 6-9.

Figure 6A:
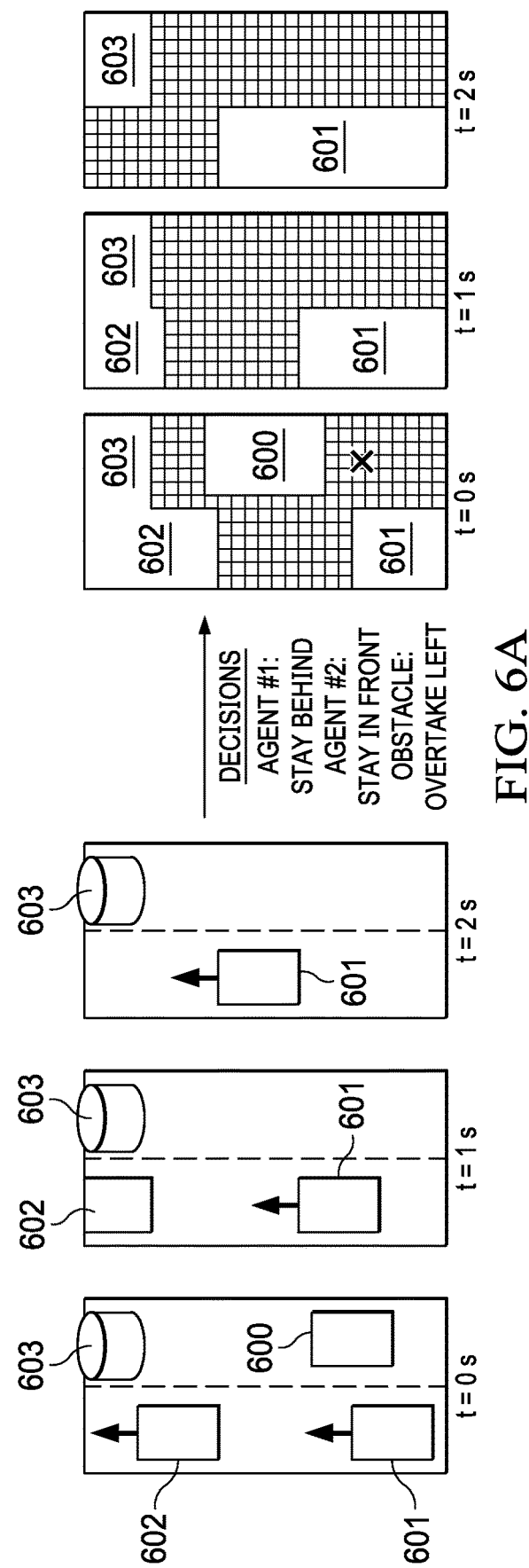
FIG. 6A illustrates a spatio-temporal grid for a first maneuver type.

FIG. 6A illustrates a spatio-temporal grid for a first homotopy. The first homotopy is vehicle 600 overtaking object 603 by performing a lane change from the right lane into a pocket in the left lane between agents 601, 602. Spatio-temporal grids are shown for discrete time steps t=0 second(s), t=1 s and t=2 s. There is a spatio-temporal grid for each discrete time step in the MPC prediction horizon. The white areas in the grids indicate areas occupied by agents 601, 602 and object 603. The remaining areas in the grid collectively define a unimodal corridor representing the first dynamic homotopy constraints, and thus the area vehicle 600 can occupy during the maneuver at the particular time step. For example, at t=0 s, there is a large pocket between agents 601, 602 for vehicle 600 to merge into. At t=1 s, agent 602 is about even with object 603 and the pocket is smaller. At t=3 s, agent 602 overtakes object 603 and vehicle 600 must now merge in front of agent 601 before agent 601 overtakes object 603.

Figure 6B:
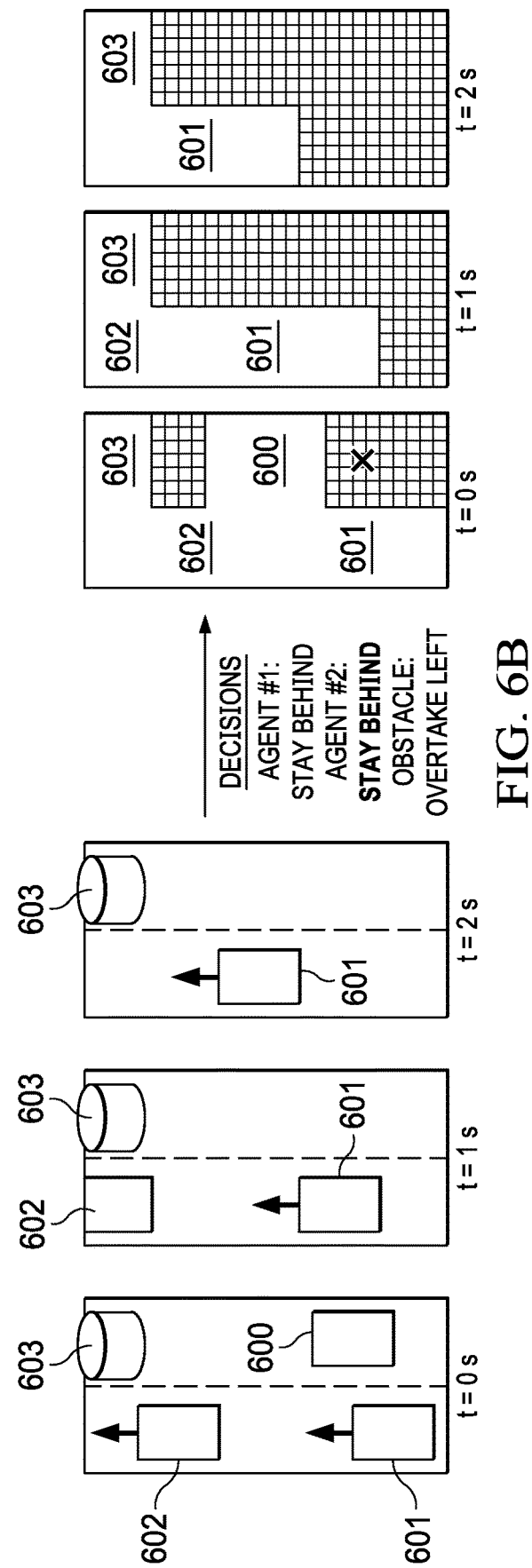
FIG. 6B illustrates a spatio-temporal grid for a second maneuver type.

FIG. 6B illustrates a spatio-temporal grid for a second homotopy. The second homotopy is vehicle 600 overtaking object 603 by performing a lane change from the right lane behind agents 601, 602. Spatio-temporal grids are shown for the second homotopy for discrete time steps t=0 s, t=1 s and t=2 s. There is a spatio-temporal grid for each discrete time step in the MPC prediction horizon. The white areas in the grids indicate areas occupied by agents 601, 602 and object 603. The remaining areas (dark) in the grid collectively define a unimodal corridor representing dynamic constraints of the second homotopy, and thus the area in that vehicle 600 can occupy during the maneuver for the particular time step. For example, at t=0 s agents 601, 602 are constraining vehicle 600 to the right lane. At t=1 s, agents 601, 602 continue in the left lane with agent 602 being on the left side of obstacle 603, leaving room for vehicle 600 to slow down in the right lane.

As can be observed from FIGS. 6A and 6B, the dynamic homotopy constraints for these lane change maneuvers have been encoded into unimodal corridor constraints representing the homotopy at each time step in the MPC prediction horizon. However, because the unimodal corridor constraints are encoded in a discrete grid, it is desirable to make the discrete grid continuously-differentiable before it is incorporated into a grid MPC trajectory optimizer, as described in reference to FIG. 9. In an embodiment, this can be done using spline functions, as described in reference to FIG. 7.

Figure 7:
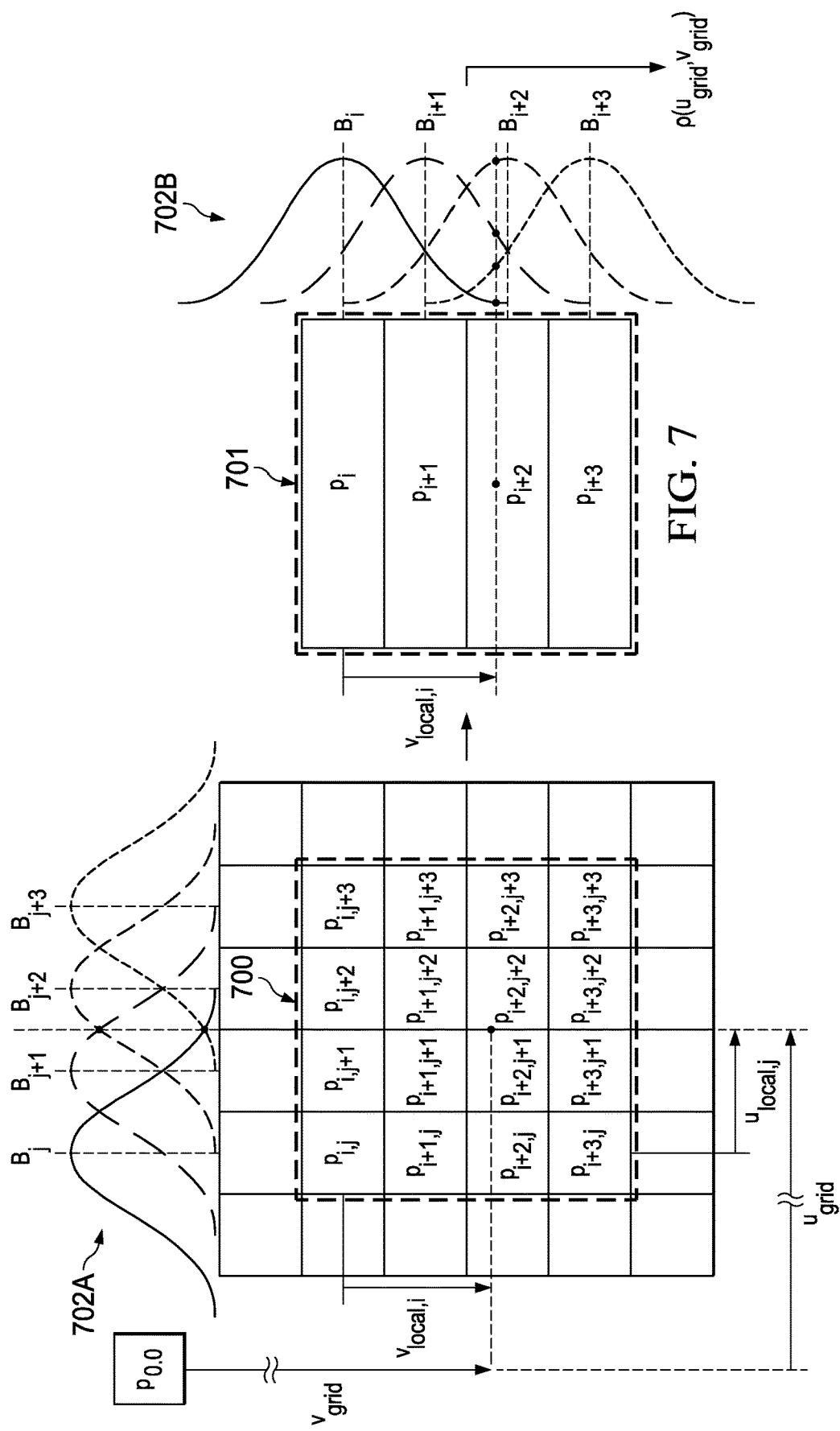
FIG. 7 illustrates using curve fitting to make the discrete grids shown in FIGS. 6A, 6B continuously-differentiable.
Figure 8:
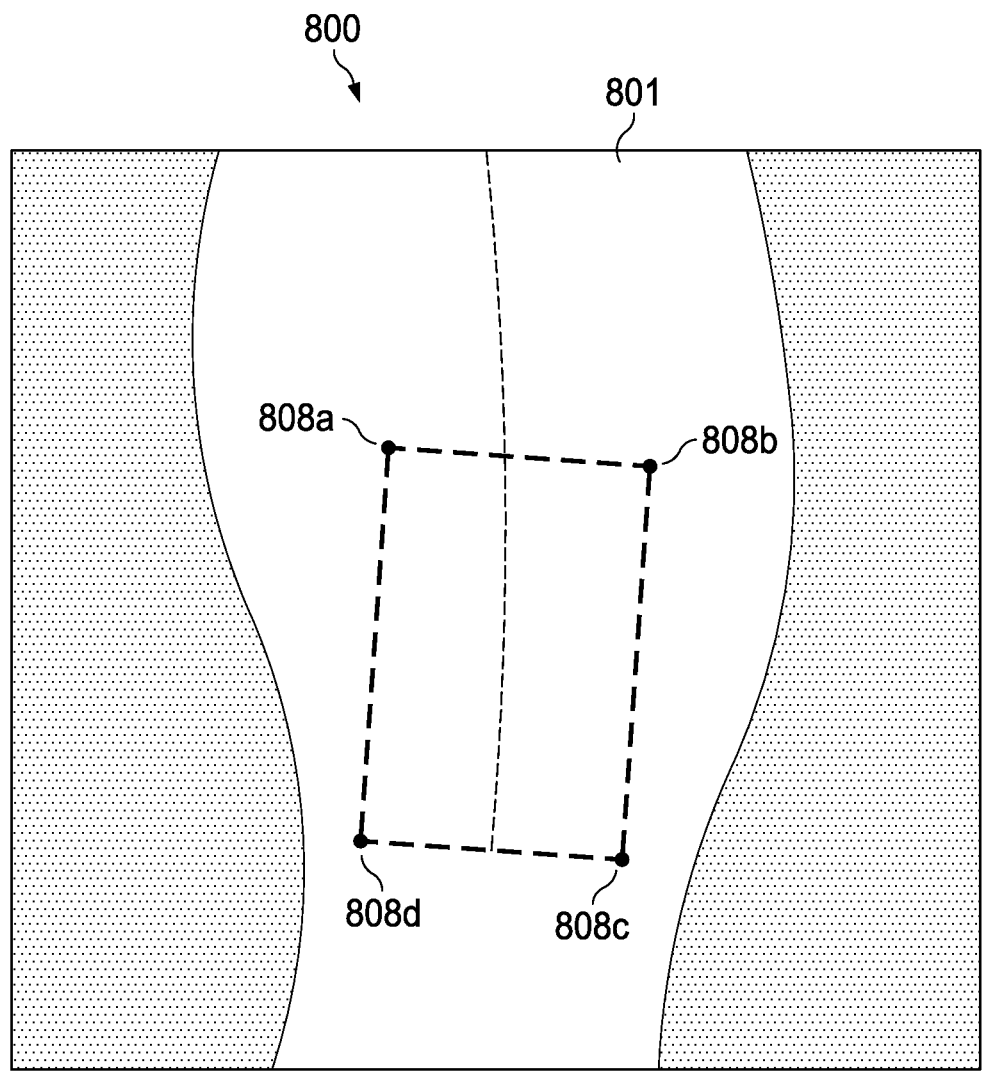
FIG. 8 illustrates unimodal corridor constraints representing a homotopy encoded as convex shapes with smooth edges in the spatio-temporal grid and probing points on the ego vehicle perimeter that contribute to a collision cost at each MPC prediction stage.

FIG. 7 Illustrates using spline functions for the continuously-differentiable querying of the discrete spatio-temporal grids shown in FIGS. 6A, 6B. In an embodiment, a non-rational B-spline (i.e. a simple non-weighted B-spline) is used to combine neighboring cell values continuously while providing the corresponding gradients and differentiability necessary for the MPC trajectory realizer, where the knots for the B-splines in the grid are uniformly distributed so that the control points and knots are organized in a 2D space. The result is that the unimodal corridor constraints representing the dynamic homotopy constraints are encoded as convex shapes with smooth edges in the grid, as shown in FIG. 8. In an embodiment, the dynamic homotopy constraints are encoded as non-convex shapes where regions with agents and other obstacles are blacked out.

Referring again to FIG. 7, each grid cell value is a grid cell occupancy value $\rho$ ($u_{grid}$, $v_{grid}$), where $u_{grid}$ represents a column of patch 700 in the grid and $v_{grid}$ represents a row of patch 700, thereby indicating a position of the cell in patch 700. In an embodiment, querying the grid cell occupancy value $\rho$ ($u_{grid}$, $v_{grid}$) includes summing the weighted contributions from all the values within patch 700 along the u-axis using the weights from cubic basis functions 702A, resulting in the column vector 701, and then summing the elements of 701 using the weights from cubic basis functions 702B. In an embodiment, grid occupancy values can be binary, (e.g., a "1" or "0") indicating whether the cell is included in the unimodal corridor or outside the unimodal corridor, respectively. In an embodiment, the grid occupancy values can be scalar values (e.g., floating point precision values) which are used to indicate cost or collision probabilities.

FIG. 8 illustrates patch 800 of a spatio-temporal grid with unimodal corridor 801 that has been made continuously-differentiable using spline functions, as described in reference to FIG. 7. As shown in FIG. 8, unimodal corridor 801 the edges along the value axis are smoothed, i.e. there are no value discontinuities. If for example patch 800 would only have binary values (0 or 1), when querying an occupancy value near a transition boundary the resulting queried value will gradually increase from 0 to 1 due to the smoothing effect of the cubic basis functions 702A, 702B. Thus, the smooth edges shown in FIG. 8 are not required, however in an embodiment the smooth edges help to increase the non-zero gradient span useful for the MPC.

In an embodiment the smooth edges help to increase the non-zero continuously-differentiable gradient span, thus making the grid more suitable for incorporation into the grid MPC trajectory optimizer, which relies on both the first and second order derivatives (e.g., gradients and Hessian) to perform the optimization.

In an embodiment, probing points 802a-802d contribute to a collision cost at each MPC prediction stage. For example, an MPC collision cost is introduced with a static and kinetic collision energy term based on the grid occupancy value of a particular location (x, y), as shown in Equation [1]:

$$\zeta(v,x,y) = (c_{static} + c_{kinetic} v^2) \rho(x,y), \quad [1]$$

where v is the velocity of the vehicle, (x, y) is the position of the vehicle in the grid, $c_{static}$ and $c_{kinetic}$ are the static and kinetic energy cost parameters, respectively, and $\rho(x, y)$ is the queried grid occupancy value at position (x, y) in the grid.

Each probing point 802a-802d contributes to the MPC collision cost $c_k$, at each MPC prediction stage k, as shown in Equation [2]:

$$c_k(x, y, v) = \sum_{p=0}^{n-1} \zeta(v, x + x_p, y + y_p), \quad [2]$$

where $(x_p, y_p)$ represents the offset of the probing point relative to the vehicle position in the grid and n is the number of probing points (e.g., n=4).

In an embodiment, the total collision cost $c_k(x, y, v)$ over N prediction stages is part of the total MPC cost function in a trade-off with other objective functions (e.g., comfort, safety, tracking) according to Equation [3]:

$$C = \sum_{k=0}^{N} \ldots + c_k(x[k], y[k], v[k]). \quad [3]$$

Figure 9:
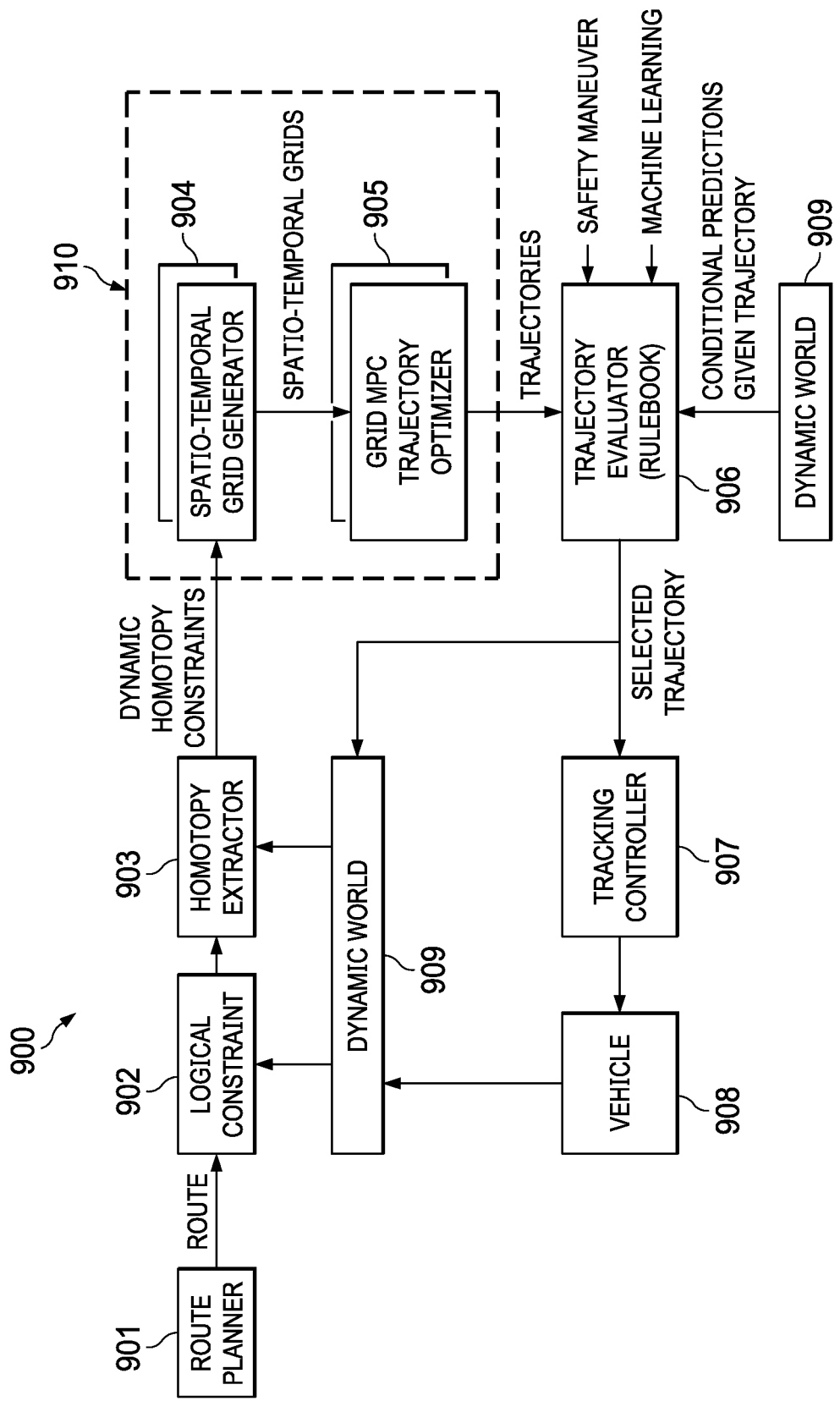
FIG. 9 is block diagram of a planning system that uses grid-based trajectory realization.

FIG. 9 is a block diagram of planning and control system 900, in accordance with one or more embodiments. Planning and control system 900 includes route planner 901, logical constraint generator 902, homotopy extractor 903, grid-based trajectory realizer 910, trajectory evaluator 906, tracking controller 907 and AV 908. Grid-based trajectory realizer 910 further includes, for each homotopy of N extracted homotopies, spatio-temporal grid generator 904 and grid MPC trajectory generator 905 (e.g., goal location).

In an embodiment, route planner 901: 1) receives an initial and terminal state (e.g., goal location) for AV 908; 2) plans a desired sequence of geometric blocks of road data ("roadblocks") forming lanes with a lane router; 3) divides the route into road segments based on a lane change, such that a segment does not contain a lane change; 4) selects road segments in which the AV 908 is located based on the AV's physical state (obtained from dynamic world model 909) which is projected on the roadblocks; 5) extracts anchor paths for selected road segments (which can be marked as anchor "desired" in case a lane change is desired); and 6) trims anchor paths based on maximal/minimal length. In case there is no lane change required, the adjacent anchor path is extracted and labeled only as "optional," meaning the AV 908 can use the lane if needed for collision avoidance.

In an embodiment, logical constraint generator 902 includes generating at least one of "hard" constraints or "soft" constraints previously defined above. In some embodiments, different constraints are sampled differently. For example, homotopy extractor 903 can operate at 10 Hz and the trajectory optimization can be performed twice as fast at 20 Hz.

In an embodiment, homotopy extractor 903 receives a route plan from route planner 901 which contains an "anchor path." The "anchor path" is the best estimate of the lane that AV 908 is located in, and an optional path (a potentially desired path) which can be used by AV 908 when performing a lane change. In an embodiment, the route plan also contains speed squared constraints and spatial constraints encoding the lane geometry (e.g., lane width) which are computed along the anchor path. In an embodiment, homotopy extractor 903 generates a graphical representation of the operating environment of AV 908, the physical state of AV 908 based on sensor data (e.g., speed, position) and possible outcomes. In an embodiment, the graphical representation is a decision tree (e.g. a directed acyclic graph) that includes a number of nodes where each node represents a sample of the decision space for a particular driving scenario for AV 908, such as, for example, a plurality of maneuvers related to other vehicles and objects and environmental constraints (e.g., drivable area, lane markings).

Given an initial state of AV 908, a terminal state of AV 908 on the anchor path, a map representation and predictions of other agents in the scene, the homotopy extractor 903 finds all approximately feasible maneuvers the AV can perform. Note that in this context the resulting maneuvers might not be dynamically feasible but the homotopy extractor 903 guarantees that the resulting constraint set describing the maneuver is not an empty set (considering also the AV footprint). An AV maneuver is described by the homotopy, which is a unique space wherein any path starting with an initial AV state and ending at a terminal AV state can be continuously deformed. To find these maneuvers, homotopy extractor 903 iterates over all possible decisions the AV can take with respect to other agents, e.g. pass on the left/right side, pass before or after or just stay behind, and outputs constraint sets describing the maneuvers for each homotopy. In short, an output of homotopy extractor 903 is a set of all possible maneuvers which can be performed when considering the road and all surrounding agents, where each maneuver is described as a spatio-temporal space that the AV is allowed to occupy. Although this can be a computationally expensive search, a set of simple checks is used to eliminate all infeasible combinations.

To be able to describe constraints representing where the other agents are located, and what a collision of AV 908 with these agents mean, every agent is converted into a station-time obstacle or station-spatial-time obstacle. The station-time constraint is a constraint parameterized over time and the station-spatial-time constraint is a constraint parameterized over both station and time, wherein in both cases "station" refers to the traveled distance along the lane centerline (i.e., anchor path).

In an embodiment, grid-based trajectory realizer 910 takes as input the station-time constraints and the station-spatial-time constraints for each extracted homotopy (collectively, the "dynamic homotopy constraints"). For each extracted homotopy, spatial-temporal grid generator 904 encodes the dynamic homotopy constraints for the homotopy in a temporal sequence of continuously-differentiable grids, as previously described above in reference to FIG. 6A, 6B above. The continuously-differentiable spatio-temporal grids are input into grid MPC trajectory optimizer 905, which outputs an optimized trajectory based on the station-time and station-spatial-time constraints.

In an embodiment, trajectory evaluator 905 uses one or more rulebooks, one or more machine learning models 909 and/or one or more safety maneuver models to score the optimized trajectories, and then uses the scores to select the trajectory that is the most compliant with the rules in the one or more rulebooks (hereinafter, the "selected trajectory").

Tracking controller 907 (e.g., DBW system 202*h* in FIG. 2) is configured to receive the selected trajectory and generate and/or transmit control signals to operate one or more devices of vehicle 908 (e.g., powertrain control system 204, steering control system 206, brake system 208, and/or the like) in accordance with the selected trajectory.

Figure 10:
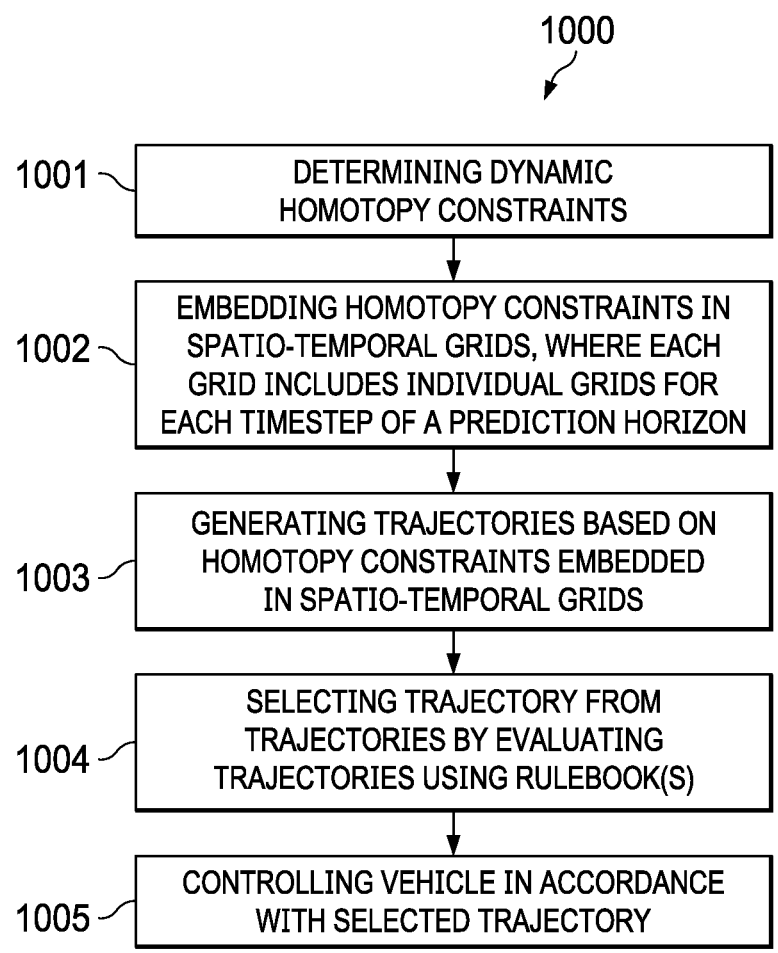
FIG. 10 is a flow diagram of a process of encoding homotopy constraints into spatio-temporal grids.

FIG. 10 is a flow diagram of process 1000 of grid-based trajectory realization by encoding dynamic homotopy constraints into spatio-temporal grids. Process 1000 can be implemented by, for example, AV compute 202*f* shown in FIG. 2, and in particular planning system 404 and control system 408 shown in FIG. 4.

Process 1000 includes the steps of determining, with at least one processor, a plurality of dynamic homotopy constraints associated with a scenario involving a vehicle in an environment (1001), embedding, with the at least one processor, the dynamic homotopy constraints in a plurality of spatio-temporal grids, where each spatio-temporal grid includes individual grids for each timestep of a prediction horizon (1002); generating, with the at least one processor, a plurality of trajectories based on the plurality of dynamic homotopy constraints embedded in the plurality of spatio-temporal grids (1003), selecting, with the at least one processor, a particular trajectory from among the plurality of trajectories (1004); and controlling, with a control circuit of the vehicle, the vehicle in the environment based on the particular trajectory selected from among the plurality of trajectories (1005). The details of each of the foregoing steps are described above in reference to FIGS. 5-9.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
   determining, with at least one processor, a plurality of dynamic homotopy constraints associated with a scenario involving a vehicle in an environment;
   embedding, with the at least one processor, the plurality of dynamic homotopy constraints in a plurality of continuously-differentiable, spatio-temporal grids a plurality of times for each timestep of a prediction horizon, where each spatio-temporal grid includes individual grids for each timestep of a prediction horizon;
   generating, with the at least one processor, a plurality of trajectories based on the plurality of dynamic homotopy constraints embedded in the plurality of spatio-temporal grids;
   selecting, with the at least one processor, a particular trajectory from among the plurality of trajectories generated; and
   controlling, with a control circuit of the vehicle, the vehicle in the environment based on the particular trajectory selected from among the plurality of trajectories.

2. The method of claim 1, wherein the plurality of trajectories are generated by a grid-based model-predictive control (MPC) trajectory realizer.

3. The method of claim 2, wherein the grid-based MPC trajectory realizer is formulated as an optimization problem in Cartesian coordinates.

4. The method of claim 3, wherein the optimization problem comprises:
   computing a MPC collision cost with static and kinetic collision energy terms based on one or more agents in the environment encoded within a spatio-temporal grid; and
   contributing to the MPC collision cost probing points on a perimeter of the vehicle when generating the plurality of trajectories.

5. The method of claim 4, further comprising:
   determining a total collision cost for a plurality of MPC prediction stages;
   evaluating an MPC cost function that includes the total collision cost and at least one other cost.

6. The method of claim 5, wherein the at least one other cost is associated with vehicle passenger comfort.

7. The method of claim 5, wherein the at least one other cost is associated with tracking error.

8. The method of claim 1, wherein at least one dynamic homotopy constraint is embedded in the spatio-temporal grid as a shape with smooth edges.

9. The method of claim 1, wherein the spatio-temporal grid includes a velocity and direction of travel of at least one agent.

10. The method of claim 9, wherein a prediction uncertainty for the at least one agent is encoded within the spatio-temporal grid and included in the optimization problem.

11. The method of claim 1, wherein the spatio-temporal constraint is rasterized in the spatio-temporal grid and a spline function is applied to rows and columns of the spatio-temporal grid to make the spatio-temporal grid map continuously-differentiable and capable of being queried.

12. The method of claim 11, wherein the spline function is a B-spline.

13. The method of claim 12, wherein cubic basis functions are used to combine neighboring cell values in the spatio-temporal grid continuously, while being twice differentiable providing a corresponding gradient.

14. The method of claim 13, wherein prediction uncertainty is included in the spatio-temporal grid by convolving the spatio-temporal grid with a Gaussian kernel.

15. A system comprising:
at least one processor; and
memory storing instructions that when executed by the at least one processor, cause the at least one processor to perform operations comprising:
determining a plurality of dynamic homotopy constraints associated with a scenario involving a vehicle in an environment;
embedding the plurality of dynamic homotopy constraints in a plurality of continuously-differentiable, spatio-temporal grids a plurality of times for each timestep of a prediction horizon, where each spatio-temporal grid includes individual grids for each timestep of a prediction horizon;
generating a plurality of trajectories based on the plurality of dynamic homotopy constraints embedded in the plurality of spatio-temporal grids;
selecting a particular trajectory from among the plurality of trajectories generated; and
controlling the vehicle in the environment based on the particular trajectory selected from among the plurality of trajectories.

16. The system of claim 15, wherein the plurality of trajectories are generated by a grid-based model-predictive control (MPC) trajectory realizer.

17. The system of claim 16, wherein the grid-based MPC trajectory realizer is formulated as an optimization problem in Cartesian coordinates.

18. The system of claim 17, wherein the optimization problem comprises:
computing a MPC collision cost with static and kinetic collision energy terms based on one or more agents in the environment encoded within a spatio-temporal grid; and
contributing to the MPC collision cost probing points on a perimeter of the vehicle when generating the plurality of trajectories.

19. The system of claim 18, the operations further comprising:
determining a total collision cost for a plurality of MPC prediction stages; and
evaluating an MPC cost function that includes the total collision cost and at least one other cost.

20. The system of claim 19, wherein the at least one other cost is associated with vehicle passenger comfort.

21. The system of claim 19, wherein the at least one other cost is associated with tracking error.

22. The system of claim 15, wherein at least one dynamic homotopy constraint is embedded in the spatio-temporal grid as a shape with smooth edges.

23. The system of claim 15, wherein the spatio-temporal grid includes a velocity and direction of travel of at least one agent.

24. The system of claim 23, wherein a prediction uncertainty for the at least one agent is encoded within the spatio-temporal grid and included in the optimization problem.

25. The system of claim 15, wherein the spatio-temporal constraint is rasterized in the spatio-temporal grid and a spline function is applied to rows and columns of the spatio-temporal grid to make the spatio-temporal grid map continuously-differentiable and capable of being queried.

26. The system of claim 25, wherein the spline function is a B-spline.

27. The system of claim 26, wherein cubic basis functions are used to combine neighboring cell values in the spatio-temporal grid continuously, while being twice differentiable providing a corresponding gradient.

28. The system of claim 27, wherein prediction uncertainty is included in the spatio-temporal grid by convolving the spatio-temporal grid with a Gaussian kernel.

29. A non-transitory, computer-readable storage medium having stored thereon instructions that when executed by the one or more processors, cause the one or more processors to perform operations comprising:
determining a plurality of dynamic homotopy constraints associated with a scenario involving a vehicle in an environment;
embedding the plurality of dynamic homotopy constraints in a plurality of continuously-differentiable, spatio-temporal grids a plurality of times for each timestep of a prediction horizon, where each spatio-temporal grid includes individual grids for each timestep of a prediction horizon;
generating a plurality of trajectories based on the plurality of dynamic homotopy constraints embedded in the plurality of spatio-temporal grids;
selecting a particular trajectory from among the plurality of trajectories generated; and
controlling the vehicle in the environment based on the particular trajectory selected from among the plurality of trajectories.

* * * * *